United States Patent Office 2,954,012
Patented Sept. 27, 1960

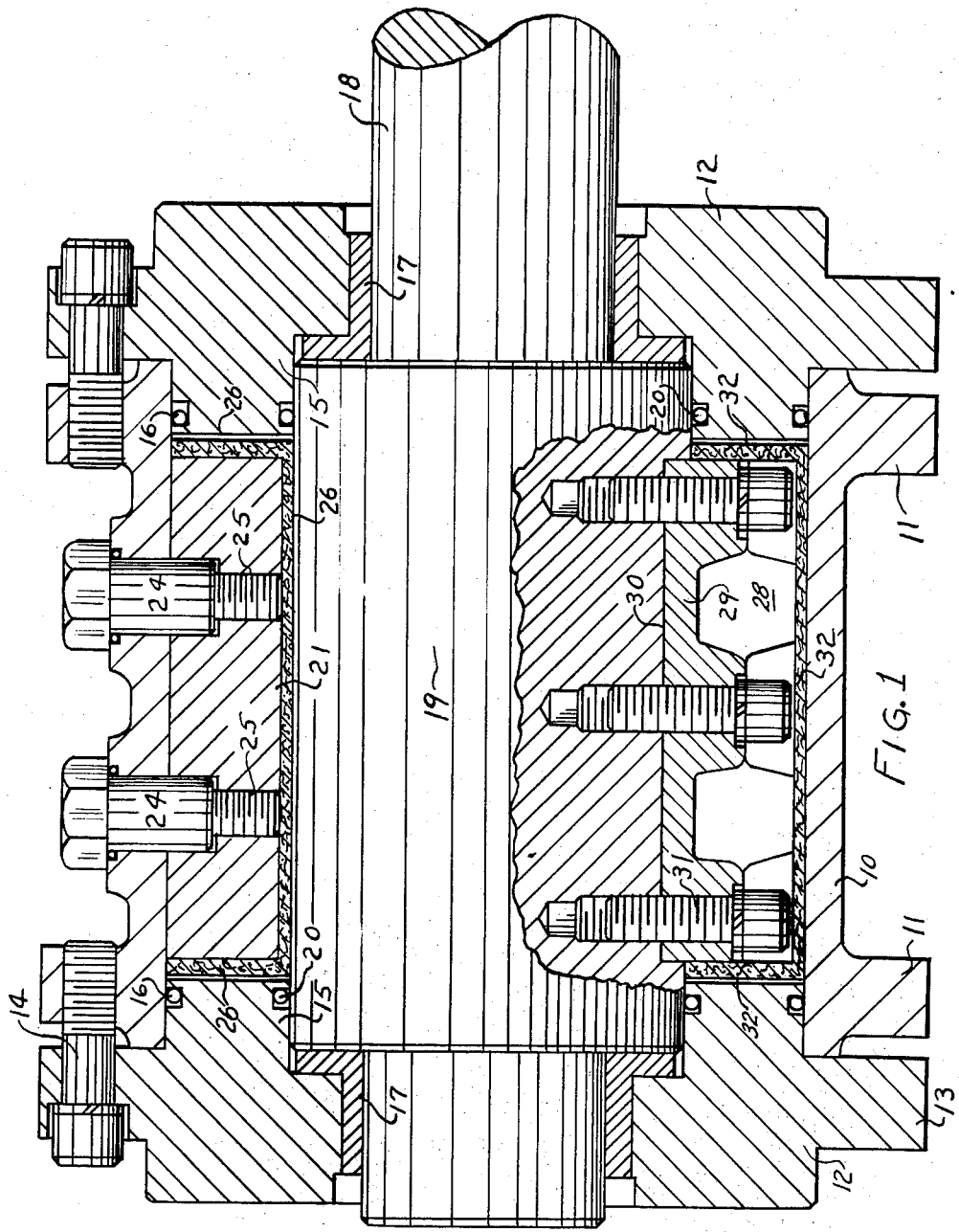

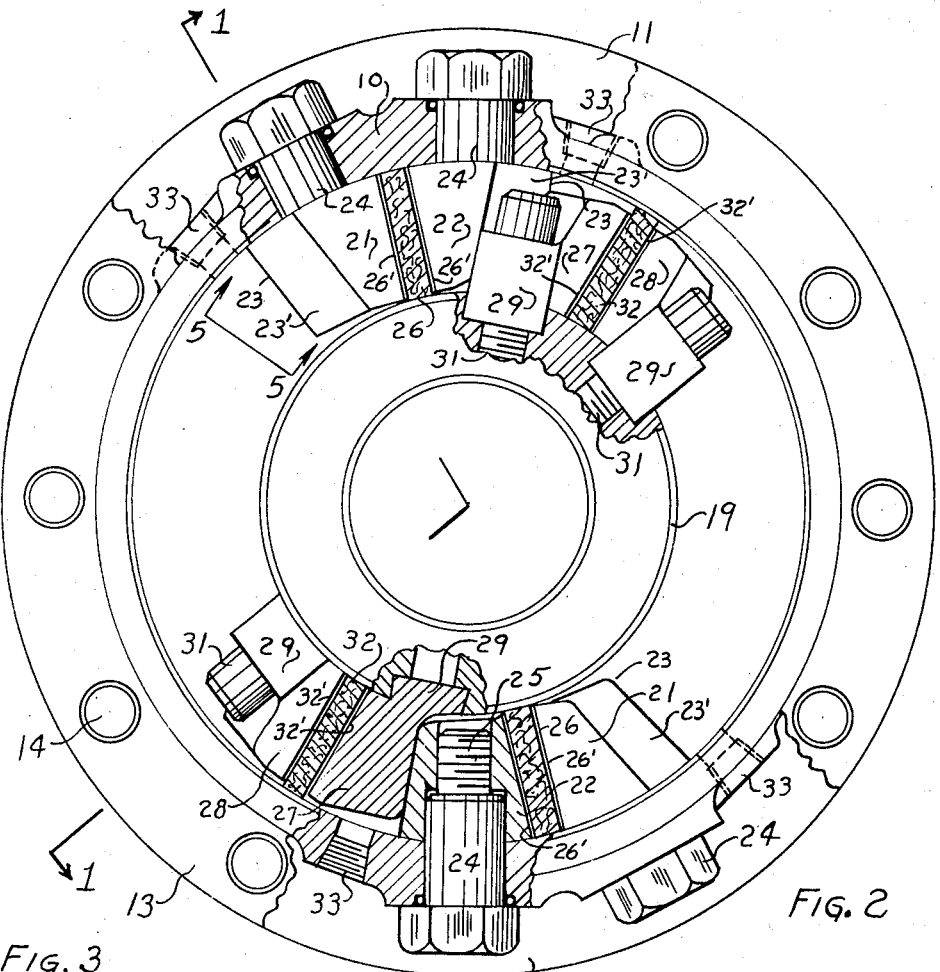
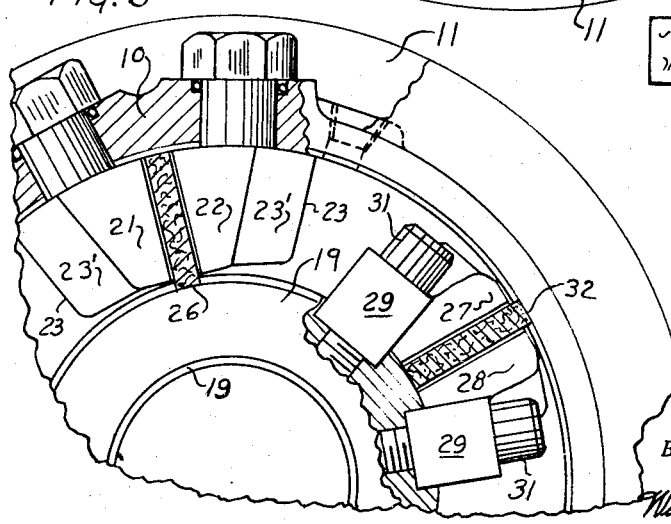
Fig. 3
Fig. 2
Fig. 4
Fig. 5
INVENTORS
MYRON S. CURTIS
BY WILLIAM M. SHOOK
ATTORNEYS

2,954,012
PRESSURE FLUID MOTOR

Myron S. Curtis, Cleveland, and William M. Shook, New Philadelphia, Ohio, assignors to The Warner & Swasey Company, Cleveland, Ohio, a corporation of Ohio Filed June 14, 1957, Ser. No. 665,843

9 Claims. (Cl. 121—99)

This invention relates to a pressure fluid motor and more particularly to a pressure fluid motor of the type wherein the rotor and shaft are oscillatable between predetermined angular limits.

An object of the invention is to provide a pressure fluid motor which is so constructed that its various parts can be readily and economically machined and assembled and when so assembled said parts will be located in accurate relationship to each other.

Another object is to provide a pressure fluid motor wherein improved and efficient seals are provided between the various parts of the motor.

Pressure fluid motors of the type wherein the rotor and shaft are oscillatable between predetermined angular positions can be used to impart tilting or swinging movements to a part of an apparatus and wherein it is desirable and necessary to maintain such part of an apparatus in a swung or tilted position for substantial time period. Unless a pressure fluid motor of this type, when so used, is provided with adequate and efficient sealing means the tilted or swung part of the apparatus cannot effectively be held in its tilted or swung position as the leakage exhaust of the pressure fluid from the motor could cause the rotor and shaft thereof to have undesired movement.

Another object of the invention is to provide improved sealing means for a pressure fluid motor of the type wherein the rotor and shaft are oscillatable between predetermined angular limits to enable such motor to be used for imparting tilting or swinging movement to a part of an apparatus and to efficiently maintain such part in its different swung or tilted positions for appreciable time periods.

A further object is to provide a pressure fluid motor having angularly displaced stationary vanes and angularly displaced oscillatable vanes and which vanes are so constructed as to enable the use of improved sealing means in the motor and to reduce to a minimum wear between the relatively movable parts and the necessity of machining elongated keyways and the like for the proper positioning of the vanes.

Further and additional objects and advantages inherent in the invention will become apparent hereinafter during the detailed description of an embodiment of the invention which is to follow and which embodiment is illustrated in the accompanying drawings forming part of this description and wherein:

Fig. 1 is a longitudinal sectional view through a pressure fluid motor embodying the invention and is taken substantially on line 1—1 of Fig. 2, looking in the direction of the arrows, and with the packing exaggerated in size so as to more clearly illustrate the invention.

Fig. 2 is a view partly in end elevation and partly in section of the pressure fluid motor.

Fig. 3 is a fragmentary view similar to the upper part of Fig. 2 but showing the upper stationary vane in different relationship with respect to one of the oscillatable vanes than is the case of Fig. 2, Fig. 4 is a detail detached plan view on a smaller scale of the packing strips carried by the stationary and oscillatable vanes, and Fig. 5 is a view taken along the line 5—5 of Fig. 2.

The pressure fluid motor illustrated in the drawings is provided with a cylindrical housing or casing 10 open at its opposite ends. The housing 10 adjacent its open opposite ends is provided exteriorly with annular radially projecting flanges 11. End closure plates or members 12 close the opposite ends of the housing 10.

The closure plates or members 12 are provided on their circumferences with radially projecting annular flanges 13 and said closure plates or members are secured to the opposite ends of the housing or casing 10 by means of securing bolts 14 passing through a series of circularly spaced openings in the flanges 13 and screwed into a series of circularly spaced threaded openings in the flanges 11 of the housing or casing.

The closure plates or members 12 on their inner sides are provided with circular inwardly extending flange skirts or sleeves 15 which interfit closely the cylindrical bore in the cylindrical housing or casing 10 adjacent the opposite ends of the latter. Suitable packings or sealing means are interposed between the circumferences of the flange skirts or sleeves 15 and the cylindrical bore of the housing 10 as, for example, the skirts 15 may be provided with annular grooves in which are mounted O-rings 16 that have sealing contact with the wall of the bore.

The closure plates or members 12 are provided with central axially aligned bores communicating at their inner ends with larger counterbores within the skirts or sleeves 15 and said bores and counterbores are coaxial with the cylindrical bore in the housing 10. The bores and counterbores in the closure plates or members 12 mount bearing bushings 17 in which the motor shaft 18 is rotatable or oscillatable.

The motor shaft 18 is provided with a concentric cylindrical rotor 19 which contacts and extends between the bushings 17 and adjacent its opposite ends is rotatable in the counterbores in the skirts or sleeves 15 of the closure members 12.

Suitable packings or sealing means between the walls of the counterbores in the skirts or sleeves 15 and the circumference of the rotor 19 are provided and which, by way of illustration, may be O-rings 20 mounted in annular grooves formed in the walls of the counterbores within the skirts or sleeves 15 as clearly shown in Fig. 1 and which have sealing engagement with the rotor.

The housing or casing 10 is provided within its cylindrical bore with a pair of angularly spaced stationary vanes which extend longitudinally of the motor from closely adjacent the inner end of the skirt 15 of one member 12 to closely adjacent the inner end of the skirt 15 of the other member 12. It will be noted there is a slight space between the ends of the stationary vanes and the ends of the sleeves or skirt 15. The stationary vanes referred to are illustrated as being diametrically spaced apart, wherefore the shaft 18 and rotor 19 can have a maximum oscillation of slightly less than 180°.

The stationary vanes are each formed of two separate vane sections or parts 21 and 22 which are so mounted as to be spaced apart a predetermined distance circularly of the bore in the housing. Each of the vane sections 21 and 22 is of a width in the radial direction of the motor such that its inner end is spaced slightly from the circumference of the rotor 19. Also each of the separate vane sections or parts 21 and 22 on its side that is remote to the other vane section or part is provided with a step-like or recessed portion 23 defining three axially spaced recesses 23' as shown in Fig. 5 for a purpose later to be explained. The separate vane sections or parts 21 and 22 of the stationary vanes are bolted in position in the bore of the housing by shoulder bolts 24 which pass through radial openings in the housing 10 and have threaded reduced inner ends 25 which screw into threaded radially extending holes in the vane sections or parts 21 and 22. The reduced inner threaded ends 25 of the shoulder bolts 24 act also as dowel pin portions to locate the vane sections or parts and in addition as shear pins.

As previously stated, the separate vane sections or parts 21 and 22 of each of the stationary vanes are spaced apart with a predetermined angular spacing for a purpose now to be explained. A rectangular strip 26 of packing material is mounted in the space between the vane sections or parts 21 and 22 of each stationary vane. The strips of packing 26 are of such length that they extend beyond the opposite ends of the vane parts 21 and 22 and engage with a sealing contact the inner ends of the skirts or sleeves 15 of the closure plates or members 12, it being recalled that the opposite ends of the vane parts are slightly spaced from the inner ends of the skirts 15. The strips of packing 26 are of a width in the radial direction of the motor such that they engage with a sealing contact the circumference of the rotor 19 and the wall of the bore in the housing 10, it being recalled that the inner ends of the parts 21 and 22 of the stationary vanes are slightly spaced from the circumference of the rotor 19.

The strips of packing 26 are of a thickness slightly less than the width of the space between the vane parts 21 and 22 so that there is a slight clearance 26' between the packing 26 and the vane parts 21 and 22. It will thus be seen that the strips of packing 26 have a degree of compression imparted thereto radially of the motor by the wall of the bore in the housing 10 and by the circumference of the rotor 19. Also it will be seen that the packing strips 26 have a degree of compression imparted thereto longitudinally of the motor due to the engagement of the opposite ends of the packing strips with the inner ends of the skirts 15 of the closure members 12. However, since the thickness of the packing strips 26 is slightly less than the width of the space between the vane parts 21 and 22, the said vane parts do not exert any compressive action on the packing strips in the direction of their thickness; and the difference in the thickness of the packing strips and the width of the spaces between the vane parts 21 and 22 accommodates any radial and longitudinal compression of the strips previously referred to.

It will be seen that the packing strips 26 provide an efficient seal between the rotor 19 and the stationary vanes, between the stationary vanes and the bore of the housing 10 and between the opposite ends of the stationary vanes and the inner ends of the skirts or sleeves 15 of the closure members 12.

The rotor 19 is provided on its circumference with a pair of vanes (hereinafter referred to as oscillatable vanes) substantially diametrically located and which can oscillate in the spaces between the stationary vanes. The oscillatable vanes each comprises two separate vane sections or parts 27 and 28 secured to the circumference of the rotor 19 and with the sections or parts of each oscillatable vane spaced apart circularly a predetermined distance.

Each of the separate vane sections or parts 27 and 28 of the oscillatable vanes extends longitudinally of the motor with its opposite ends slightly spaced from the inner ends of the skirts or sleeves 15 of the closure members 12. Also the vane sections 27 and 28 are of a width in the radial direction of the motor such that their outer surfaces are slightly spaced from the wall of the bore in the housing or casing 10.

The vane sections 27 and 28 are each provided with locating or key portions 29 of less longitudinal length than the vane sections or parts 27 and 28 and which portions interfit at their radial inner ends locating longitudinal keyways 30 formed in the circumference of the rotor 19.

The locating or key portions 29 of the oscillatable vane sections or parts 27 and 28 mount a number of socket head cap screws 31 spaced longitudinally of the motor and screwed into threaded holes or sockets in the rotor 19.

It will be recalled that the vane sections or parts 27 and 28 of each oscillatable vane are circularly spaced apart a predetermined distance as was the case with the vane parts or sections 21 and 22 of each stationary vane. In this space between the sections 27 and 28 of each oscillatable vane there is mounted a rectangular packing strip 32 similar to the packing strips 26 of the stationary vanes. The longitudinal length of the packing strips 32 is such that their opposite ends engage with a sealing contact the inner ends of the skirts or sleeves 15 of the closure members 12, wherefore the packing strips 32 have a degree of longitudinal compression imparted thereto.

The width of the packing strips 32 in the radial direction of the motor is such that the opposite longitudinal side edges of the packing strips 32 engage with a sealing contact the bore in the housing 10 and the circumference of the rotor 19 and said packing strips have a degree of compression imparted thereto in the direction of their width, i.e., the radial direction of the motor. However, the thickness of the packing strips 32 is slightly less than the width of the space between the vane sections or parts 27 and 28 of the oscillatable vanes so that there is a slight clearance 32' between the strips 32 and the parts 27 and 28 and hence said sections or parts 27 and 28 effect no compression of the strips. This difference in the width of the spaces between the sections 27 and 28 and the thickness of the strips 32 accommodates any longitudinal and radial compression of the strips 32.

It will be noted that the packing strips 32 effectively seal the opposite ends of the oscillating vanes with respect to the inner ends of the skirts 15 of the end closure members 12 and also have efficient sealing engagement longitudinally of the motor with the bore in the housing 10.

The housing 10 is provided with suitable inlet and exhaust ports indicated at 33 and to which suitable conduits for the pressure fluid can be connected as will be well understood. It will be understood that the inlet and exhaust of the pressure fluid to and from the motor can be so controlled that the rotor 19 and shaft 18 can be oscillated between the stationary vanes and at the limits of oscillation in opposite directions the portions 29 of the oscillatable vane sections 27 and 28 can overlie the step portions 23 of the vane sections 21 and 22 of the stationary vanes. More specifically, the key portions 29 are adapted to bottom in the axially spaced recesses in the step-like portion 23, which serve as stops, Fig. 1. Also, the sides of the stationary vane parts 22 serve as stops for the sides of the movable vane parts 27, Fig. 2. The recesses in the stepped portion 23 permits a greater angular movement of the rotor in the stator.

If the pressure fluid motor embodying the invention and described herein is utilized to impart tilting or swinging movements in opposite directions to a part of an apparatus and to maintain said part in tilted or swung positions, it will be seen that the packing strips 26 and 32 provide such efficient seals that the rotor 19 will be maintained in any desired oscillated position to maintain for a desired time period such part of the apparatus in any desired tilted or swung position.

The packing strips 26 and 32 function efficiently to prevent undesired escape of pressure fluid which might cause the rotor 19 and shaft 18 to move away from their previously oscillated position and result in the tiltable or swingable part of the apparatus moving from its predetermined and desired tilted or swung position and not maintained therein for the necessary time period.

It will have been observed that the stationary vanes do not contact the rotor 19 and that the oscillatable vanes do not contact the bore of the housing 10, and consequently the operation of the motor does not cause any wear between these parts and the tight seals effected by the strips 26 and 32 will be maintained since said strips are under longitudinal and radial compression.

In the detailed description heretofore set forth it will have been observed that the various parts of the motor are so constructed as to reduce to a minimum complicated or difficult or expensive machining operations on these parts. Furthermore, it will have been noted that the parts are so constructed that they may be readily assembled and when so assembled will have definite and proper relationship with respect to the other parts of the motor, thereby increasing the efficiency of the manufacture, assembly and operation of the motor.

Although a preferred embodiment of the invention has been illustrated and described herein it will be understood that the invention is susceptible of various modifications and adaptations within the scope of the appended claims.

Having thus described our invention, we claim:

1. A pressure fluid motor comprising a housing having a cylindrical bore therethrough, closure members at the opposite ends of said housing and provided with axially aligned bores coaxial with the housing bore, a motor shaft rotatably supported in the closure member bores and provided with a rotor in the housing bore, said housing bore having a stationary longitudinally extending vane therein secured to said housing and having a free inner longitudinal edge spaced slightly from the circumference of said rotor, said rotor being provided on its circumference with a longitudinally extending vane and having a free outer longitudinal edge spaced slightly from the wall of the housing bore, both of said vanes being formed of a pair of separate vane elements spaced apart a predetermined angular distance circularly of the housing bore and of said rotor, and rectangular packing strips mounted in the spaces between the elements of both of said vanes, said packing strips being of a thickness less than the spacing between the elements of said vanes and of a length such that their opposite ends contact the closure members with a sealing engagement and of a width in the radial direction of the motor such that the strips have their opposite longitudinal edges contacting with a sealing engagement the circumference of the rotor and the wall of the bore in said housing, wherefore said packing strips have a degree of longitudinal and radial compression imparted thereto but are free from compression in the direction of their thickness.

2. A pressure fluid motor as defined in claim 1 and wherein said housing is provided with a pair of said vanes extending radially inwardly of the housing bore and angularly displaced with respect to each other while said rotor is provided with a pair of said vanes extending radially outwardly from the circumference thereof and angularly displaced with respect to each other, all of said vanes being formed of said pairs of spaced vane elements and mounting in the space between said elements of each pair said rectangular packing strips.

3. A pressure fluid motor as defined in claim 1 and wherein the vane carried by said housing is secured thereto by shoulder bolts passing through openings in said housing and interfitting counterbores in the vane elements and provided on their inner ends with reduced threaded portions screwed into threaded bores or openings formed in said vane elements.

4. A pressure fluid motor as defined in claim 1 and wherein said rotor is provided on its circumference with longitudinally extending keyways while the vane elements of the vane carried by said rotor have locating key portions interfitting said keyways, said portions of said vane elements mounting cap screws extending therethrough and screwed into threaded holes formed in said rotor.

5. A pressure fluid motor as defined in claim 1 and wherein the vane elements of the vane carried by said housing are provided on their remote sides with step portions which are adapted to underlie a part of the vane elements of the vane carried by said rotor when said latter vane abuts the vane carried by said housing.

6. A pressure fluid motor as defined in claim 1 and wherein said closure members on their inner sides are provided with circular inwardly extending sleeves which interfit the bore in said housing, while sealing means are provided between the circumferences of said sleeves and the wall of said housing bore.

7. A pressure fluid motor as defined in claim 6 and wherein said closure members are provided with counterbores located in part within said sleeves and coaxial with the bores in said closure members, while said rotor rotatably interfits said counterbores, and sealing means is mounted between the walls of said counterbores and the circumference of said rotor.

8. A pressure fluid motor as defined in claim 7 and wherein the ends of the rectangular packing strips carried by said vanes having sealing engagement with the inner ends of said sleeves of said closure members.

9. In a fluid motor, a rotor, a stator having wall means forming an opening therein, said rotor having at least one vane fixed thereto comprised of two axially extending parts having parallel axially and radially extending opposed surfaces, first planar packing means disposed between said parallel rotor vane part surfaces, said first planar packing means being coextensive with said parallel rotor vane part surfaces and of a sufficient axial length and radial width to be axially and radially compressed between said rotor and said wall means of said stator, said stator having at least one vane fixed thereto in said opening comprised of two axially extending parts having parallel axially and radially extending opposed surfaces, and second planar packing means disposed between said parallel stator vane part surfaces, said second planar packing means being coextensive with said parallel stator vane part surfaces and of sufficient axial length and radial width to be axially and radially compressed between said rotor and said wall means of said stator, said first and second planar packing means each being freely disposed in position between said vane parts with only axial and radial compression forces to hold the same in place.

References Cited in the file of this patent

UNITED STATES PATENTS

| | | |
|---|---|---|
| 860,461 | Germiner | July 16, 1907 |
| 2,393,204 | Taylor | Jan. 15, 1946 |
| 2,466,389 | Davis | Apr. 5, 1949 |
| 2,540,903 | Moushey et al. | Feb. 6, 1951 |
| 2,633,105 | Lasater | Mar. 31, 1953 |
| 2,778,338 | Shafer | June 22, 1957 |